Patented Apr. 10, 1951

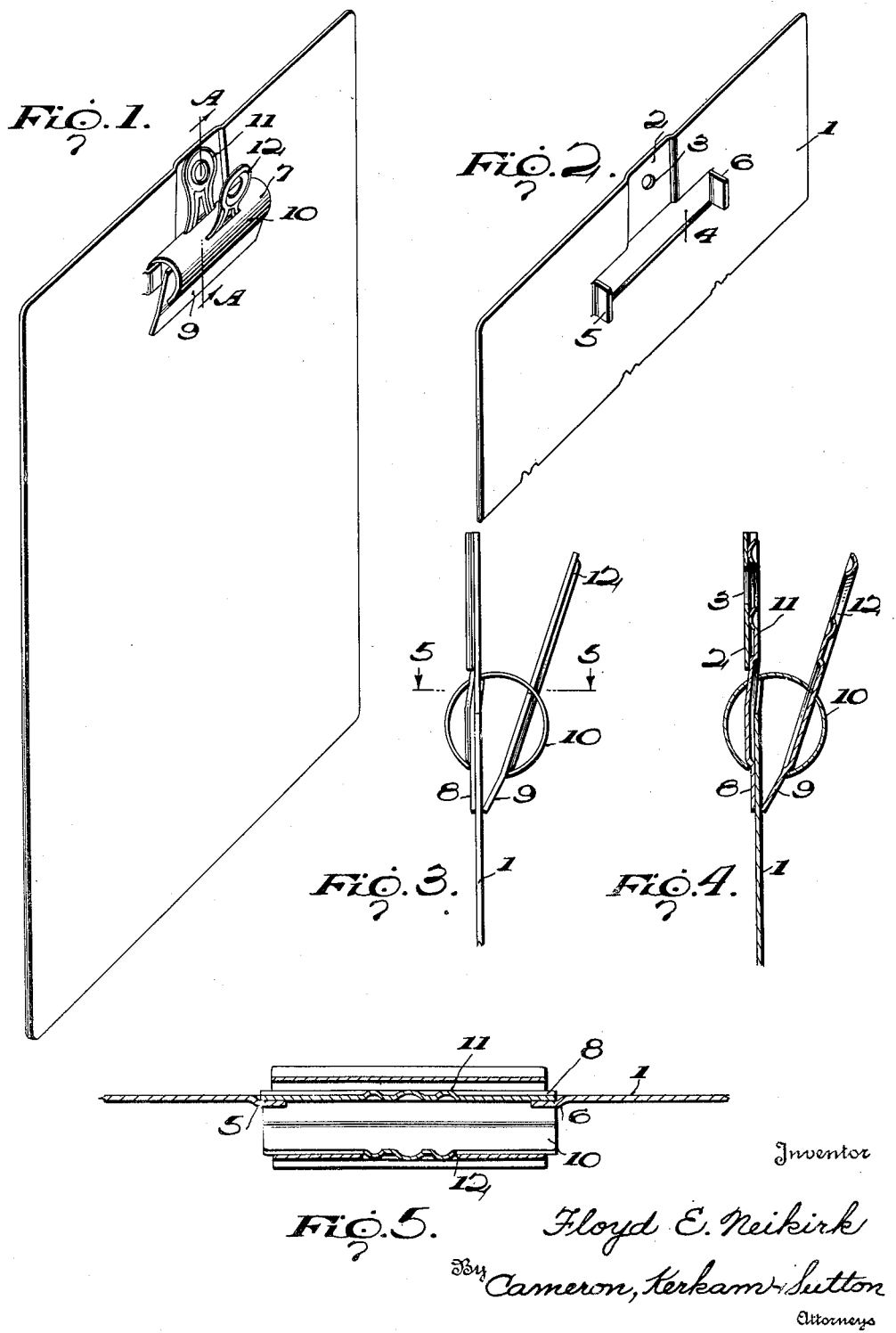

2,548,389

UNITED STATES PATENT OFFICE 2,548,389

CLIP BOARD

Floyd E. Neikirk, Clyde, Ohio

Application July 1, 1947, Serial No. 758,273

2 Claims. (Cl. 24—66)

This invention pertains to improvements in clip boards and analogous spring clip holders for sheafs of loose leaves, bills, or other papers.

It is a primary object of the invention to provide a clip board which is of simple yet strong construction and which requires no screws, rivets or solder to hold the clip permanently in a fixed relationship with the upper portion of the board.

It is a further object of this invention to provide such a clip board in which the clip is set into the board in such fashion that the combination is flat and easy to handle and which will hold a sheaf of loose papers firmly and permanently in desired position.

Other and further objects of this invention will become apparent as this specification proceeds.

Referring to the drawings,

Fig. 1 is a perspective view of the clip and board combination;

Fig. 2 is a view of the upper portion of the board alone showing the recess, rectangular vent and tongues for holding the clip in position.

Fig. 3 is a side elevation of the combination;

Fig. 4 is a sectional view of the clip mounted in the board taken on line A—A of Fig. 1; and Fig. 5 is a cross sectional view of the combination taken from above taken on line 5—5 of Fig. 3.

In the drawings, 1 indicates the baseboard for the combination, which is preferably formed of tempered aluminum or other light suitably resilient metal. As shown board 1 is appropriately recessed at 2 at the center of its upper edge to receive one of the finger grips of a conventional bulldog type clip. Recess 2 is appropriately stamped or pressed into board 1. Hole 3 is shown so positioned in recess 2 as to register with the hole in the base finger grip 11 of the clip. Rectangular vent 4 is shown disposed below and extending laterally from recess 2. Vent 4 is designed to receive the cylindrical spring 10 of a bulldog type clip in such fashion that lower clamp plate 8 of the clip is disposed flush against the under surface of board 1 below vent 4. Retaining fingers 5 and 6 are shown cut laterally at the extremities of rectangular vent 4. Fingers 5 and 6 are preferably cut out and raised to a substantially vertical position during the cutting of vent 4. Vent 4 is preferably of slightly less width than cylindrical spring 10 of clip 7 when fingers 5 and 6 are in horizontal position.

In assembling the clip and board combination the following steps are preferably followed:

The unprocessed board 1 is first placed in a die press and recess 2 and hole 3 are stamped therein. The board is then passed to another press which cuts out vent 4 and the upper and lower edges of fingers 5 and 6 and then raises fingers 5 and 6 to a substantially vertical position with respect to board 1. Following this second step a bulldog type clip 7 in partially open condition is inserted horizontally through rectangular vent 4, the top edge of vent 4 contacting the top portion of cylindrical spring 10 of the clip, finger grip 11 of the clip registering snugly with recess 2 of the board and lower clamp plate 8 of the clip lying flush against the under surface of the board below vent 4. Fingers 5 and 6 are then forced downwardly against the lateral edges of spring 10, holding clip 7 permanently in rigid position with respect to the upper surface of board 1. As shown, vent 4 is preferably of slightly less width than cylindrical spring 10 of clip 7, making it necessary that fingers 5 and 6 be in raised position before clip 7 may be inserted in the vent.

Referring to Fig. 3 of the drawings it will be seen that when the clip is mounted in vent 4 substantially one third of cylindrical spring 10 of the clip lies below the board and lower bearing surface 8 thereof is disposed against the under surface of the board and in flush relationship therewith, lower finger grip 11 of the clip being firmly fitted within recess 2 disposed at the upper central portion of the board.

The foregoing structure provides a clip and board combination which is rigid and integral and which requires no solder, rivets or screws for assembly. The die stamping steps on board 1 may be rapidly accomplished and the insertion of the clip and the final die pressing of fingers 5 and 6 thereagainst to complete the assembly requires little time. The combination lends itself readily to rapid mass production. If desired, the entire stamping and cutting out of recess 2, hole 3, vent 4 and fingers 5 and 6 may be accomplished in one operation.

The invention is susceptible of various embodiments without departing from the spirit thereof. For example, if desired, clamp plates 8 and 9 of the clip may be enlarged to extend across the entire width of the board to provide an even more firm gripping for a paper sheaf applied thereto.

As a result of the location of the lower jaw of the clip flush against the under surface of the board a powerful and positive clamping action between the upper jaw 9 of the clip and the upper surface of the board is procured. The clip board will hold one sheet firmly and its clamping and holding actions are proportionately increased with increase in the size of the sheaf of papers being clamped. The combination is light and compact and occupies a relatively small space. The materials utilized may be varied within a wide range without departing from the spirit of the invention.

This specification is by way of illustration only and nothing therein is intended to limit the scope of the invention. Attention is directed to the appended claims for the limitation of its scope.

What is claimed is:

1. In a clip board, a base member, a substantially rectangular opening cut into said base member adjacent its upper edge, a depressed recess disposed at right angles to said opening and extending upwardly therefrom, tongues cut out at the lateral extremities of said opening, a cylindrical spring clip positioned in said opening and held therein by said tongues superimposed over the lateral extremities of the cylindrical spring of said cylindrical spring clip, one jaw of said spring clip being disposed against the rear face of said base member, the other being angularly disposed against its forward face, the rearward finger piece of said clip fitting into said recess.

2. In a clip board, a base, a rectangular opening in said base centrally exposed adjacent its upper edge, a depressed recess in said base centrally disposed at right angles to said opening and extending upwardly therefrom, inwardly extending tongues cut out at the lateral extremities of said opening, a cylindrical spring clip positioned in said opening and held therein by the superposition of said tongues over its lateral extremities, one finger piece of said clip fitting in said recess and its jaws extending against the rear and front faces of said base.

FLOYD E. NEIKIRK.

REFERENCES CITED

The following references are of record in the file of this patent:

UNITED STATES PATENTS

| Number | Name | Date |
|---|---|---|
| 1,365,320 | Hohnsbeen | Jan. 11, 1921 |
| 1,398,591 | Hohnsbeen | Nov. 29, 1921 |
| 1,398,592 | Hohnsbeen | Nov. 29, 1921 |